J. H. CARR.
PLATFORM WHEEL.
APPLICATION FILED AUG. 15, 1913.

1,109,400.

Patented Sept. 1, 1914.

UNITED STATES PATENT OFFICE.

JOHN H. CARR, OF ALHAMBRA, CALIFORNIA.

PLATFORM-WHEEL.

1,109,400.

Specification of Letters Patent. Patented Sept. 1, 1914.

Application filed August 15, 1913. Serial No. 784,897.

*To all whom it may concern:*

Be it known that I, JOHN H. CARR, a citizen of the United States, residing at Alhambra, in the county of Los Angeles and State of California, have invented certain new and useful Improvements in Platform-Wheels, of which the following is a full, clear, and exact specification.

This invention relates to platform wheels, that is wheels for wagons, traction engines and other vehicles employing endless flexible platforms or tracks on which the wheels proper move and which progress with the wheels.

One object of the present invention is to reduce the friction between the wheel and platform or track.

Another object is to provide a wheel of this kind with a cushion or pneumatic tire, thereby rendering the same resilient to a certain extent.

Further objects will become apparent as the description proceeds.

The invention will be first hereinafter described in connection with the accompanying drawings, which constitute a part of this specification, and then set forth more specifically in the claims at the end of the description.

Figure 2:
Figure 1:
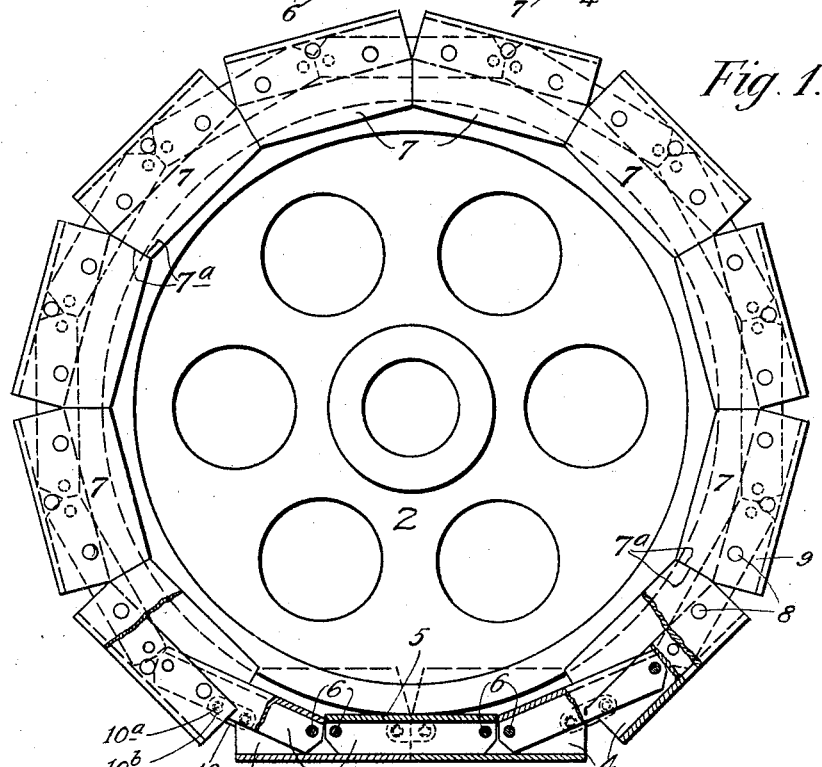

In the accompanying drawings, wherein similar reference characters are used throughout to designate corresponding parts; Figure 1 is a broken side elevation of one form of wheel constructed in accordance with my invention; Fig. 2 is a detailed inner plan view of a portion of the track, and Fig. 3 is an enlarged transverse section through the rim portion of a wheel similar to that illustrated in Fig. 1 except that the side plates attached to the shoes are extended slightly to retain a pneumatic or other tire.

In the drawings, 1 designates the wheel proper which may be of any ordinary construction and provided with a simple flat tread 2. The endless flexible track or platform 3, which is somewhat longer than the periphery of the wheel, may comprise a series of shoes 4 hinged together end to end by links 5. Both shoes and links may be of channel iron, the flanges 4ª of the shoes embracing the links and adapted to engage at their outer edges the tread of the wheel 1, while the flanges 5ª of the links extend outwardly and are adapted to contact with the bases of the shoes when the flanges of the latter are in contact with the tread of the wheel, as clearly shown in Fig. 3. The links 5 are made long enough to substantially meet at their ends so as to form a continuous track for the tread of the wheel 1 to travel on. The hinge pins 6 which connect the links to the shoes are arranged near the middle of the latter, thus causing the links to bridge the adjacent ends of the shoes.

In order to reduce the friction between the tread 2 of the wheel 1, and the links, it is desirable to positively retain the track out of contact with said tread 2 except at the bottom of the wheel. For this purpose I provide flanges or plates 7 attached to the lateral flanges 4ª of the shoes 4 and extending inwardly so as to hold the track on the wheel at the top and bottom, but having their ends 7ª cut at the proper angle to positively hold the track away from the front, rear and top portions of the wheel, as clearly illustrated in Fig. 1. These plates or flanges 7 may be secured to the flanges 4ª of the shoes by rivets 8 which also retain spacer or filler pieces 9, Fig. 3, interposed between said flanges 7 and 4ª in order to provide proper clearance for the flanges 7 at the sides of the wheel and still allow the edges of the flanges 4ª to engage the tread of the wheel. In addition to their other functions, the plates 7 serve to retain the hinge pins 6 against working out endwise or hinge pins may be riveted at the ends. It may be desirable to provide a separate or extra connection for the flanges or plates 7, which may be done in the form of links 10, Fig. 1. The holes 10ª are bored larger than the rivets 10ᵇ so as to provide a loose connection and permit play in case some hard substance gets between the shoes.

Figure 3:
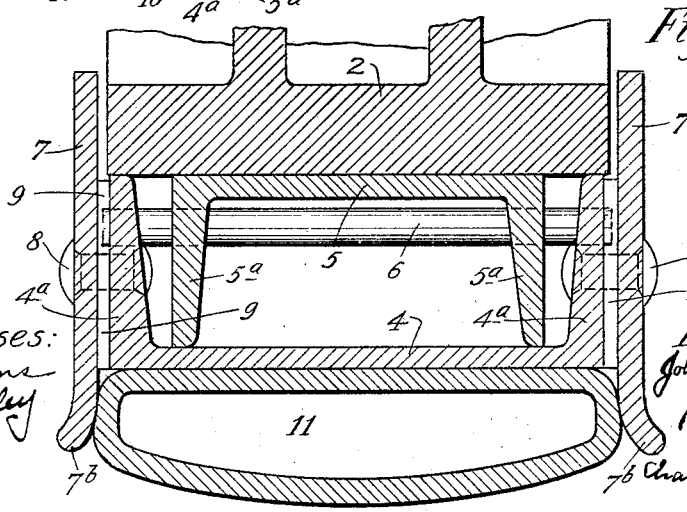

As illustrated in Fig. 3, the plates 7 may be extended, as at 7ᵇ, beyond the outer faces of the shoes 4 to provide a channel for holding a pneumatic or other tire 11 which may be passed around the track and should be sufficiently larger than said track to allow it to stand away or free from the surfaces of the shoes except at the bottom where the tire assumes a horizontal position to correspond with the track. The result of this arrangement is that a long stretch of the tire always lies flat on the ground while the wheel is passing over, and consequently there will be considerably less air-pressure required in the pneumatic tube to support the load than in the ordinary round wheel now in use on trucks and automobiles, because of the much larger surface to sustain the load. Furthermore, this tire will be less liable to puncture and will wear longer than the ordinary tire and less liable to skid or to slide under traction power. My improved form of tire, when used on the platform wheel herein disclosed, will also act as a shock absorber, for when the tire strikes an obstacle in the road, the wheel will roll forward and upward on the links 5 which bridge the shoes, and after passing the obstruction, will resume its natural position at the bottom or tread. This form of wheel is especially suitable for traveling in loose sand which is to be found in many places and in which it is now almost impossible for automobiles and trucks to go.

It will be understood, of course, that the present form of wheel may be used without the tire, by simply making the outer edges of the plates 7 flush with the outer surfaces of the shoes, as shown in Fig. 1.

Having thus described my invention, what I claim as new and desire to secure by Letters Patent of the United States is:

1. In a structure of the character described, the combination with a rotary member, of an endless track loosely surrounding the same, and comprising a series of shoes hinged together end to end, and side plates attached to said shoes and having their ends cut at an angle to positively hold the track away from the rotary member except at the bottom.

2. In a structure of the character described, the combination with a rotary member, of an endless track loosely surrounding the same, and comprising a series of shoes hinged together end to end, and side plates attached to said shoes and having their ends cut at an angle to positively hold the track away from the rotary member except at the bottom, and filler pieces interposed between the shoes and side plates for the purpose specified.

3. In a structure of the character described, the combination with a rotary member, of an endless track loosely surrounding the same, and comprising a series of shoes hinged together end to end, and side plates attached to said shoes and having their ends cut at an angle to positively hold the track away from the rotary member except at the bottom, and additional links loosely connecting said side plates.

4. In a structure of the character described, the combination with a rotary member, of an endless track loosely surrounding the same and consisting of a series of shoes, links, and transverse hinge pins connecting said shoes and links, and side plates attached to the shoes and overlapping the ends of said hinge pins for the purpose specified, said side plates also having their ends cut at an angle to positively hold the track away from the rotary member except at the bottom.

5. In a structure of the character described, the combination with a rotary member, of an endless track loosely surrounding the same, and comprising a series of shoes hinged together end to end, and side plates attached to said shoes and having their ends cut at an angle to positively hold the track away from the rotary member except at the bottom, the outer edges of said side plates projecting beyond the shoes, and a resilient tire loosely surrounding the track and arranged in the channel formed by said projecting edges of the side plates and the outer surfaces of the shoes.

In testimony whereof I have signed my name to this specification in the presence of two attesting witnesses.

JOHN H. CARR.

Witnesses:
James C. Keeler.
R. A. Walker.

---

Copies of this patent may be obtained for five cents each, by addressing the "Commissioner of Patents, Washington, D. C."